Jan. 21, 1941.     F. A. LUTHY     2,229,107
MULTIPLE PART PISTON RING
Filed Aug. 19, 1938
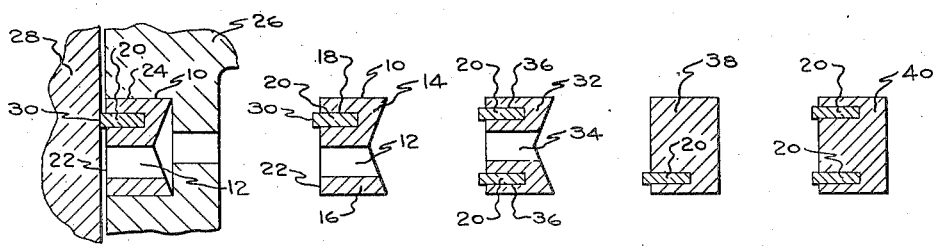
Fig. 1   Fig. 2   Fig. 3   Fig. 4   Fig. 5
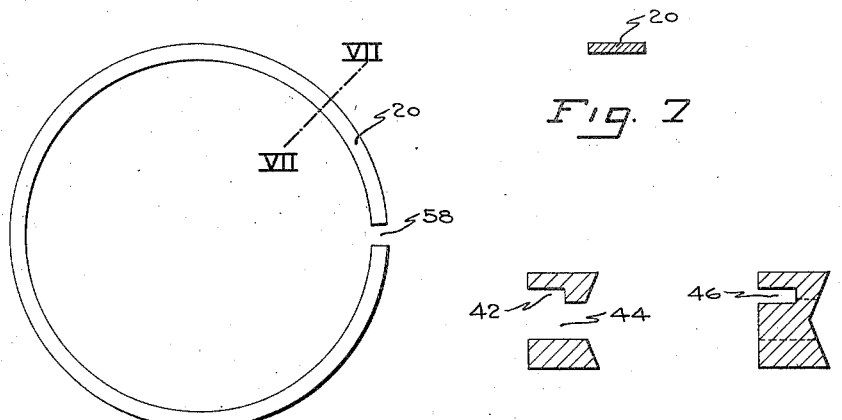
Fig. 6   Fig. 7   Fig. 8   Fig. 9
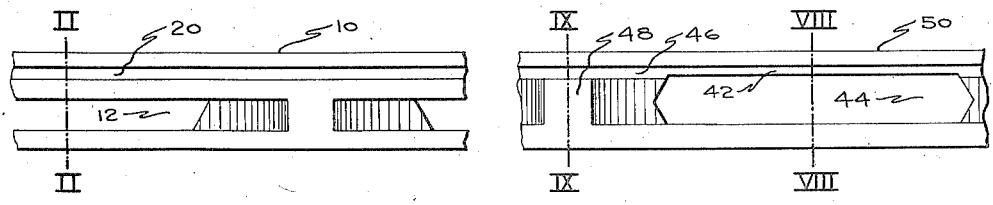
Fig. 10   Fig. 11
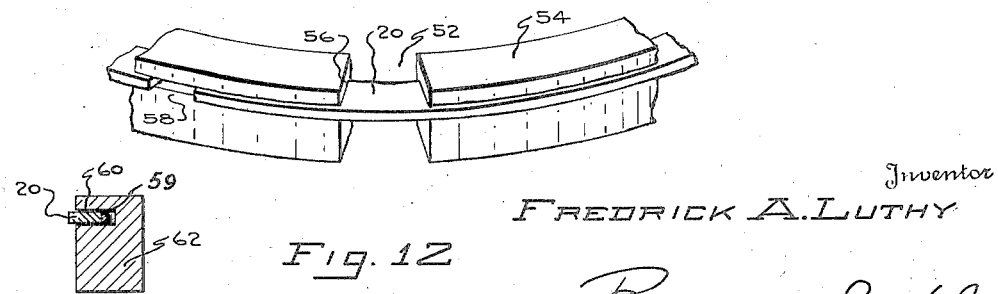
Fig. 12
Fig. 13
Inventor
FREDRICK A. LUTHY
By Beaman & Langford
Attorneys Patented Jan. 21, 1941

2,229,107

UNITED STATES PATENT OFFICE 2,229,107

MULTIPLE PART PISTON RING

Fredrick A. Luthy, Jackson, Mich., assignor to Hastings Manufacturing Company, Hastings, Mich., a corporation of Michigan Application August 19, 1938, Serial No. 225,692

2 Claims. (Cl. 309—44)

The present invention relates to improvements in piston rings of internal combustion engines and has particular reference to piston rings used for reconditioning internal combustion engines in which the cylinders through use have become worn, with the result that there is an increase in oil consumption and a loss of compression.

Where conventional cast iron piston rings are used for reconditioning internal combustion engines, due to the width of the face of the ring contacting with the cylinder wall, which through use has become highly polished, it takes a considerable time before the new piston ring has sufficiently worn itself to a seat within the cylinder and thus becomes effective for wiping the oil from the cylinder wall and preventing loss of compression. In order to overcome this difficulty, at the present time it is a common practice to use a quick seating piston ring in the form of an extremely thin metal band, which, because of its thin face contacting with the cylinder wall, will quickly wear itself to a seat. This type of ring has been used in sufficient numbers to completely fill the ring groove of the piston or it may be used singularly or in pairs with the thin rings being located above or below a conventional type of piston ring when mounted in the piston ring groove. In the latter case, the thin rings are slightly oversize as compared with the size of the conventional compression or oil ring so as to contact the cylinder wall with the conventional oil or compression ring out of contact therewith.

By the present invention I propose to provide a quick seating ring for internal combustion engines, particularly adapted for reconditioning purposes, in which a cast iron piston ring, which may be of any well-known construction, carries one or more quick seating fast wearing narrow rings which project beyond the cylinder contacting surface of the cast iron ring a few thousandths of an inch. This narrow ring is preferably carried in a circumferential groove defined in the outer circumference of the cast iron ring, the radial width of the narrow ring being slightly in excess of the depth of the groove of the cast iron ring so that the same will project beyond the face thereof. This narrow fast seating ring will promptly wear itself to a seat, sealing compression and reducing oil consumption. As the ring is used, the narrow ring will be worn flush with the outer surface of the cast iron ring, and the cast iron ring will seat itself under operation and be available to take over the function temporarily served by the narrow quick seating ring.

Accordingly, one of the objects of the present invention is to provide a multi-part piston ring for internal combustion engines and the like in which one or more narrow rings are carried by a ring of greater width and project beyond the cylinder contacting surface thereof during the period of initial wear.

Another object is to provide a split piston ring for internal combustion engines and the like carrying a narrow ring which engages with portions adjacent the split for sealing the same.

A further object is to provide a piston ring having one or more circumferential grooves about the outer circumference thereof, in which a narrow ring or rings are carried beyond the circumference of the larger ring for providing a progressive seating of the ring parts in the operating cylinder.

Referring to the drawing wherein several embodiments of the invention are illustrated, Fig. 1 is a fragmentary cross-sectional view of a piston, cylinder wall, and ring embodying the present invention, Fig. 2 is a cross-sectional view of an off-center ported oil ring shown in Fig. 1, taken on the line II—II of Fig. 10 with a single quick seating ring, Fig. 3 is a cross-sectional view of a centrally ported oil ring having a pair of quick seating rings, Fig. 4 is a cross-sectional view of a plain compression ring having a single quick seating ring, Fig. 5 is a view similar to Fig. 4 showing a pair of quick seating rings, Fig. 6 is a plan view of the quick seating ring, Fig. 7 is a cross-sectional view of the quick seating ring taken on line VII—VII of Fig. 6.

Fig. 8 is a cross-sectional view taken on the line VIII—VIII of Fig. 11 of a thin oil ring embodying the present invention, Fig. 9 is a view similar to Fig. 8 taken on line IX—IX of Fig. 11.

Fig. 10 is a fragmentary side elevational view of the oil ring and quick seating ring shown in Fig. 1, Fig. 11 is a view similar to Fig. 10 of a thin section oil ring embodying the present invention, Fig. 12 is a fragmentary perspective view of a split ring showing the quick seating ring bridging the split, and Fig. 13 is a cross-sectional view showing the seating ring with an expander spring.

Referring to Figs. 1, 2 and 10 I have shown an oil ring 10 of the general type disclosed in my Patent No. 2,078,394, granted April 27, 1937, having the oil ports 12 machined off-center to provide a thick upper portion 14 and a thinner lower portion 16. Machined in the portion 14 is a groove 18 preferably extending throughout the circumference of the oil ring 10 in which is seated a relatively thin quick seating ring 20 being generally similar in shape and size to the oil ring 10 as will be clearly seen from Fig. 6. The ring 20 may be of flat wire spring steel stock and is preferably of slightly greater radial width than the groove 18 so as to project beyond the face 22 of the ring 10. When the ring 10 with the quick seating ring 20 in place is inserted into the ring groove 24 of the piston 26 as shown in Fig. 1, the quick seating ring 20 will wipe against the bore of the cylinder 28 because the seating ring 20 is slightly oversized with reference to the oil ring 10. When it is first installed, it will actually compress the oil ring 10 to some slight extent and to some degree the oil ring 10 will function for the initial wear-in period of the seating ring 20 as an expander. Obviously, relatively rapid wear of the seating ring 20 will take place because of its narrow face 30 and the oil ring 10 will be permitted to expand and to gradually wear itself to a seat within the cylinder bore as the quick seating ring 20 is being worn flush with the face 22 of the oil ring 10. It should be apparent to those skilled in the art that the seating ring 20 will function from the start as an effective means for wiping the oil from the cylinder wall during the period that the oil ring is being worn-in. This is equally true when used in a compression ring. While the present invention is particularly designed for use in re-conditioning internal combustion engines, it is equally useful as original equipment.

In Fig. 3 I have shown a pair of quick seating rings 20 installed in an oil ring 32 centrally ported at 34. This arrangement may be used in oil rings of the larger widths offering adequate stock for machining grooves 35 within which the seating rings 20 are installed.

In Figs. 4 and 5 plain compression rings 38 and 40 are shown equipped with single and double seating rings 20 respectively.

As shown in Fig. 6 the seating ring 20 is in the form of a split ring. While this form is preferred, it is anticipated that a sectional ring may be used. Moreover, I do not wish to be limited to the fabrication of the ring 20 from spring steel wire stock as other metals and materials may be used; their selection depending for one thing upon the rate of wear of the seating ring that is desired and whether or not the seating ring is to be used for conditioning the cylinder wall in any respect.

In Figs. 8, 9 and 11 the principles of the invention have been adapted to a relatively thin oil ring in which case the recess for the seating ring 20 is milled into the oil ports with the result that you have recesses 42 bordering the ports 44 merging into grooves 46 defined along the solid areas 48 of the ring 50. In other words the lack of material above and below the ports 44 prevents the machining of a continuous groove 46.

In addition to its preliminary seating function during the period of initial wear-in, as illustrated in Fig. 12, the seating ring 20 has the additional advantage of sealing the split 52 of the ring 54 whether it be of the oil or compression type. Obviously, in installing the seating ring 20 in the groove 56, care must be taken to assure lack of register between the split 58 of the seating ring 20 and the split of the carrying ring.

While the groove in which the seating rings 20 is carried in its preferred form is of less radial width than the radial width of the seating ring 20, this is not necessary as the inherent expansion of the seating ring may be depended upon to urge the same into contact with the cylinder wall. Moreover, it is practical to use a seating ring of the same or less radial width than the groove in which it is carried and employing an expander spring 59 back of the seating ring 20 as shown in Fig. 13 of any suitable, well known construction. The seating ring 20 in this particular case is of less radial width than the groove 60 in the ring 62.

Having described my invention, what I desire to protect by Letters Patent and claim is:

1. A piston ring assembly comprising an expansible body member adapted to be expansibly received in a piston ring groove and having at least one narrow peripheral annular groove therein spaced from the sides of the body member, a thin steel cylinder wall engaging element disposed in said groove and projecting radially beyond the face of the body element for engagement with a cylinder wall, and a spring expander for said cylinder wall engaging element disposed in said groove, said body member being substantially spaced from and out of engagement with the cylinder wall adjacent said groove.

2. A composite piston ring for an internal combustion engine, comprising an annular expansible carrier element provided with at least one narrow peripheral annular groove, a thin wall engaging element of wear resistant material disposed in said groove and projecting radially substantially beyond the face of the carrier element for engagement with the cylinder wall, said carrier element being substantially spaced from and out of engagement with the cylinder wall adjacent said groove, and an annular spring expander disposed in said groove in said carrier element for supporting engagement with said cylinder wall engaging element.

FREDRICK A. LUTHY.